April 9, 1963   J. T. McNANEY   3,085,159
LIGHT RADIATION SENSITIVE VARIABLE RESISTANCE DEVICE
Filed Feb. 19, 1962   3 Sheets-Sheet 2
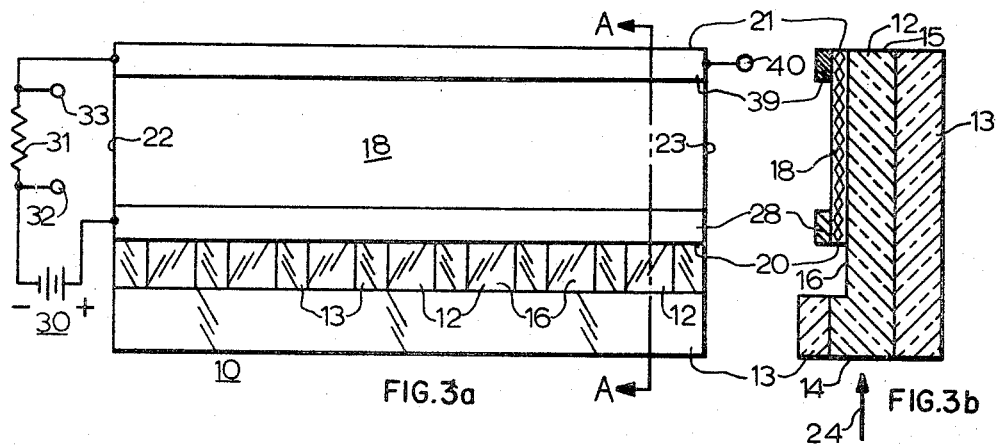
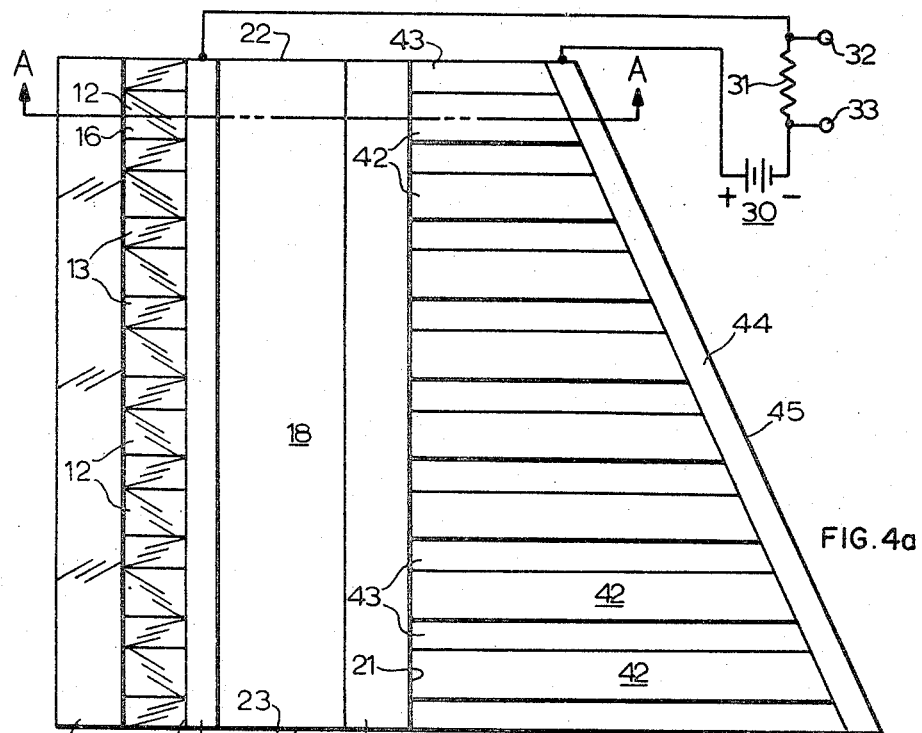
INVENTOR.
Joseph T. McNaney April 9, 1963  J. T. McNANEY  3,085,159
LIGHT RADIATION SENSITIVE VARIABLE RESISTANCE DEVICE
Filed Feb. 19, 1962  3 Sheets-Sheet 3
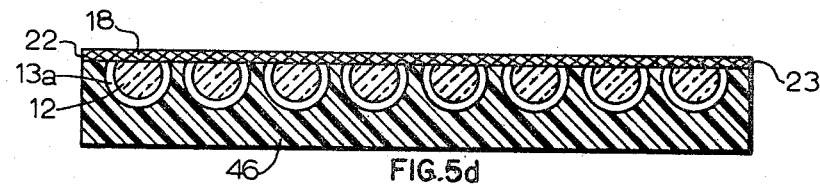
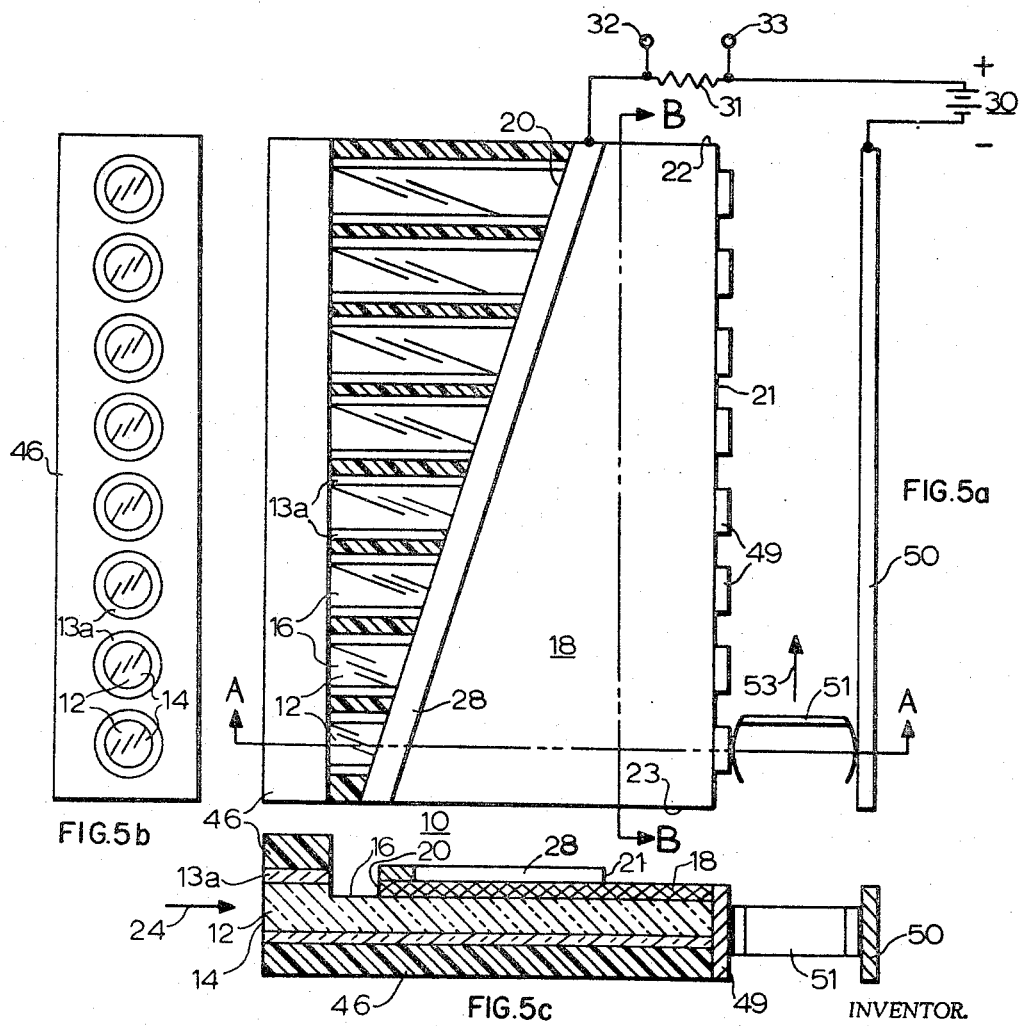
INVENTOR.
Joseph T. McNaney United States Patent Office 3,085,159
Patented Apr. 9, 1963

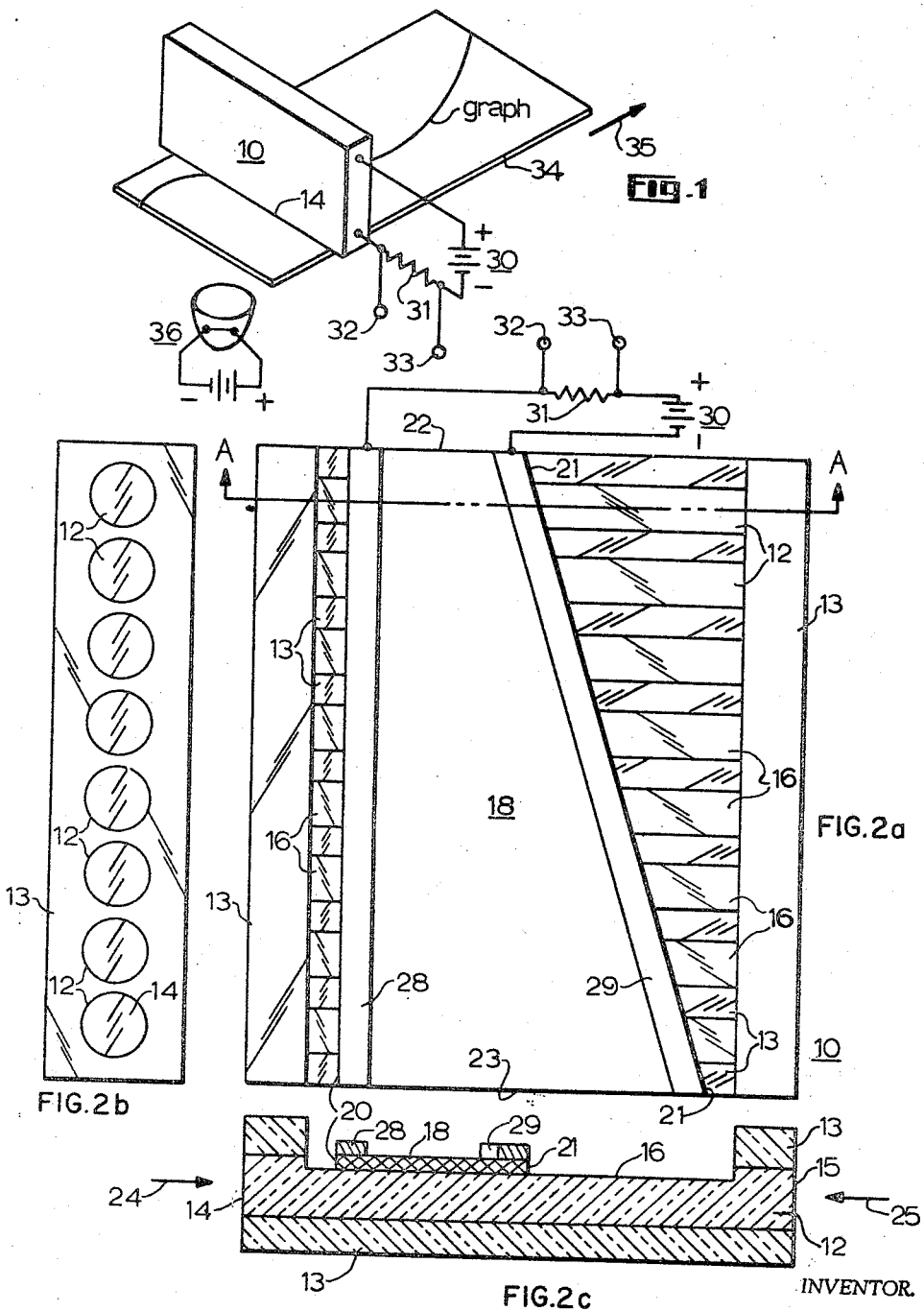

3,085,159
LIGHT RADIATION SENSITIVE VARIABLE RESISTANCE DEVICE
Joseph T. McNaney, 8548 Boulder Drive, La Mesa, Calif.
Filed Feb. 19, 1962, Ser. No. 174,230
13 Claims. (Cl. 250—211)

This invention relates to an improvement in light radiation sensitive variable resistance devices of the type usually designed to provide a change in electrical resistance in response to a change in the relative positions of a source of light radiation and the variable resistance device.

Although utility for my invention will be found more readily in a wide variety of circuit applications, insofar as electrical potentiometer functions are concerned, the more important features of my invention lend themselves to applications ranging from zero friction gyro resistance pick-off devices to optical line follower data conversion systems.

The present invention utilizes the principles of conducting light waves through transparent fibers or filaments, often referred to as light pipes, or, light conducting fibers. These pipes or fibers operate as light conductors by reflecting light waves from one side to the other during the course of their travels through such pipes or fibers, just as long as the angle at which light waves strike the sides of the conductor is greater than the critical angle. Depending upon the material from which the conductor is made, the critical angle may be as small as 50 degrees. Light conducting materials from which fibers have been made include quartz, glass, Lucite, nylon and like materials. Light conducting fibers have been drawn to diameters of less than 0.001", and such fibers have been capable of conducting light waves with a high degree of efficiency through fiber lengths exceeding 25 feet. The outer surface of these fibers normally contain a fire polish surface and when such surfaces are intimately joined with a light conducting material having a relatively low index of refraction these fibers provide very efficient light conductors. On the other hand, when such surfaces are intimately joined with an opaque material, or, intimately joined with a light conducting material having a relatively high index of refraction, these fibers make very inefficient light conductors. The opaque material will absorb a considerable amount of the light wave energy while the relatively high index material will conduct light waves away from the fire polish surface of the fiber.

In the present invention I utilize the efficient light conducting characteristics of a plurality of light conducting fibers, each having a predetermined index of refraction and intimately joined with a light conducting material having a relatively low index of refraction, for the purpose of selectively illuminating a layer of photoconductive material in performing the electrical functions of a potentiometer.

Accordingly, it is an object of this invention to provide an improvement in variable resistance devices or potentiometers, capable of responding to light radiation input commands.

It is another object of this invention to provide an improved means of converting the position of a light source to a corresponding electrical signal.

It is still another object of this invention to provide a variable resistance device which may be coupled to a source of control information by means of a light beam.

It is a further object of the invention to provide a light radiation sensitive variable resistance device capable of resolving positional changes of a light beam into relatively large numbers of electrical step functions.

Further objects and a fuller understanding of the invention will become apparent with reference to the following description and claims, taken in conjunction with the accompanying drawings in which:

FIGURE 1 is a diagrammatic view of a line follower data conversion system being shown to exemplify an application of my light radiation sensitive variable resistance device wherein variations in the position of a light source are converted into corresponding variations in electrical current flow;

FIGURES 2a, 2b and 2c show in partial sectional and plan views various details of one embodiment of my light radiation sensitive variable resistance device;

FIGURES 3a and 3b show in partial sectional and plan views various details of another embodiment of the invention;

FIGURES 4a and 4b show in partial sectional and plan views various details of another embodiment of the invention; and FIGURES 5a, 5b, 5c and 5d show in partial sectional and plan views various details of still another embodiment of the invention.

Referring now to FIGURES 2a, 2b and 2c I have shown in FIGURE 2a a plan view of an assembly 10 of control elements including a plurality of light conducting optical fibers 12, bonded together by means of a light conducting material 13, to form an array of light conductors 12 which will allow light radiation entering one end 14 to be conducted by internal reflections to the opposite end 15. An end view of the assembly 10 is shown in FIGURE 2b and in FIGURE 2c a cross section through A—A of FIGURE 2a is shown. Since it is possible that light conducting fibers 12 of the type to which I am referring can be drawn down to diameters of less than 0.001", it should be understood that the fibers 12 are shown greatly enlarged, and therefore few in number, for the purpose of assisting me in my description of the invention.

After the fibers 12 have been bonded together by means of the material 13, a predetermined portion of the material 13 and the fibers 12 has been removed so as to leave an uncoated portion 16 of each fiber 12 extending generally along their longitudinal dimension. A layer of photoconductive material is disposed upon and intimately joined with a predetermined portion of the uncoated portion 16 of each fiber 12. The layer 18 of photoconductive material, such as selenium, cadmium sulphide, silver selenide, and like materials, can be described as having a first end 20 and a second end 21, a first edge 22 and a second edge 23, and a predetermined set of longitudinal dimensions intermediate the first end 20 and the second end 21 extending from the first edge 22 to the second edge 23.

Light radiation will be allowed to enter one fiber 12, or several fibers 12 simultaneously, in a general direction of arrow 24 from the one end 14, or, in the general direction of arrow 25 from the opposite end 15. When, for example, light radiation enters a given fiber 12, the layer of photoconductive material disposed upon that given fiber 12 will be illuminated from the first end 20 to the second end 21, allowing this particular area of the layer 18 to be electrically conductive from the one end 20 to the other end 21. The layer 18, therefore, is adapted to a plurality of optical fibers 12 to provide a plurality of independent light radiation controllable longitudinally dimensioned areas extending from the one end 20 to the other end 21. Since the layer 18 is comprised of a predetermined set of longitudinal dimensions intermediate the first end 20 and the second end 21, representing various lengths extending from the first edge 22 to the second edge 23, the layer 18 under the control of light radiation escaping from the fibers 12 also represents a plurality of selectively activated variable resistors extending from the first edge 22 to the second edge 23.

The layer 18 is provided with a first electrical conductor 28 operatively connected to the first end 20 of the layer 18, and also with a second electrical conductor 29 operatively connected to the second end 21 of the layer 18. These conductors 28 and 29 function as terminals at opposite ends 20 and 21 of the plurality of selectively activated variable resistors. When the assembly 10 is utilized, for example, in a system application of the type referred to in FIGURE 1, a source of electrical current 30 is supplied to the assembly 10 through an output circuit load resistor 31, having output terminals 32 and 33. The negative terminal of the source 30 is connected to the second electrical conductor 29, and the load resistor 31 is connected to the first electrical conductor 28.

Referring now to FIGURE 1, in conjunction with FIGURE 2a, a strip 34 of recorded information is shown in a position adjacent the one end 14 of the assembly 10, which strip 34 is moveable with respect to the assembly 10 in the direction of arrow 35. The strip 34, which may be in the form of photographic film and opaque to light radiation, is shown to contain information in the form of a graph which is transparent to light radiation. Light radiation, therefore, from a source 36 will be allowed to pass through the transparent graph and enter one or more of the fibers 12 in the assembly 10, establishing a voltage between the output terminals 32 and 33 which correspond to the value of the graph at a given position on the strip 34. As the strip 34 is moved in the direction of arrow 35, a voltage between the terminals 32 and 33 will vary correspondingly with the graphic information presented to the assembly 10 from the strip 34. Although I have chosen to show a line follower data conversion system application for my light radiation sensitive variable resistance device, it should be understood that this particular application represents but one of a wide variety of circuit applications for which the invention will become readily applicable.

When in operation, the conversion of predetermined layers of photoconductive material from a non-conductor to a conductor of electrical energy will be accomplished by illuminating these layers with light waves being reflected thereto from the interface of the fibers 12 and the light conducting material 13. The efficient conduction of light waves through the fibers 12 for the purpose of illuminating the layer 18 along the longitudinal dimensions thereof, however, depends upon the light reflecting capabilities of the light conducting material 13, which, of course, depends upon the index of refraction of the material 13 in relation to the index of refraction of the optical fibers 12. The optical fibers of this invention, therefore, each have a predetermined index of refraction and the light conducting material 13 has an index of refraction less than the predetermined index of the fibers 12. Since the longitudinal dimension of each fiber 12 exceeds its cross sectional dimension a great number of times the lower index material 13 will be utilized by permitting light waves entering one end 14 of the fibers 12 to be conducted by internal reflections to the other end 15, which reflections occur after the light waves have penetrated the light conducting material 13 beyond the interface seperating the material 13 from the fibers 12. Due to a spiralling and scattering of reflected light waves during their travels along the longitudinal dimension of a fiber 12, the required percentage of the total amount of light radiation entering a fiber will be permitted to reach the adjoining layer of photoconductive material 18, and thereby illuminate the layer 18 along the longitudinal dimension thereof.

In FIGURES 3a and 3b, I show another embodiment of the invention, wherein, FIGURE 3a represents a plan view of the light radiation sensitive variable resistance device 10, and FIGURE 3b represents a cross section through A—A of FIGURE 3a. This assembly 10, as described in connection with FIGURES 2a 2b and 2c, also includes a plurality of light conductors 12, each having a predetermined index of refraction, a longitudinal dimension which exceeds its cross sectional dimension and a smooth outer surface 16 on which a layer 18 of photoconductive material has been deposited. There also is a light conducting material 13 having an index of refraction less than the predetermined index of the light conductors 12, which is intimately joined with a predetermined portion of the outer surface of each of the light conductors 12. The layer 18 of photoconductive material can be described as having first and second ends, 20 and 21, first and second edges, 22 and 23, and a predetermined longitudinal dimension intermediate the first end 20 and the second end 21, extending from the first edge 22 to the second edge 23. A first electrical conductor 28 is operatively connected to the first end 20 of the layer 18, which extends from the first edge 22 to the second edge 23 of the layer 18. A second electrical conductor 39 is operatively connected to the second end 21 of the layer 18, which extends from the first edge 22 to the second edge 23 of the layer 18, however, this second electrical conductor 39 has a predetermined electrical resistance intermediate the first edge 22 and the second edge 23.

The primary difference between the device 10 of FIGURE 2a, and the device 10 of FIGURE 3a, is that the conductor 29 in FIGURE 2a is designed to have a relatively low electrical resistance and, therefore, is an efficient conductor of electrical current, while the conductor 39 in FIGURE 3a is designed to have a relatively high electrical resistance and therefore function as a resistor to the flow of electrical current. In the FIGURES 3a and 3b embodiment, the plurality of independent light radiation controllable longitudinally dimensioned areas of the layer 18, interconnecting the conductor 28 with the resistor element 39, perform a function analogous to an adjustable connecting link between the conductor 28 and element 39, moveable intermediate the edges 22 and 23 of the layer 18.

The resistor element 39 is provided with a terminal 33 being connected to the one end thereof, and a terminal 40 being connected to the opposite end, permitting the element 39 in conjunction with the light radiation controllable areas of layer 18 to be utilized as a voltage divider. However, I have elected to show the device 10 in FIGURE 3a being connected to a voltage source 30 and a load resistor 31 in a manner similar to that shown in FIGURE 2a. The operating principles of the respective embodiments also are similar.

In FIGURES 4a and 4b, I show still another embodiment of the invention, wherein, FIGURE 4a represents a plan view of the light radiation sensitive variable resistance device 10, and FIGURE 4b represents a cross section through A—A of FIGURE 4a. In this embodiment the assembly 10 is somewhat similar in construction and the manner in which it may be utilized to the embodiments of FIGURES 2a, 2b and 2c, and 3a and 3b. There is a layer of photoconductive material having first and second ends, 20 and 21, first and second edges, 22 and 23, and a predetermined longitudinal dimension intermediate the first end 20 and the second end 21 extending from the first edge 22 to the second edge 23. There is a plurality of first light conductors 12 for supporting the layer 18 and for controlling the conduction of light radiation, selectively, to predetermined areas of the layer 18 intermediate the first and second ends, 20 and 21. The plurality of first light conductors 12 each have a predetermined index of refraction and are intimately joined with a second light conductor 13 which has an index of refraction less than that of the first light conductors 12.

The selectively light radiation controllable areas of the layer 18 are operatively connected to a first electrical conductor 28 adjacent the first end 20 of the layer 18, and these same areas of the layer 18 are operatively connected to a plurality of electrical conductors 42 adjacent the second end 21 of the layer 18. The electrical conductors 42 each have opposite ends and a predetermined electrical resistance therebetween, and are individually supported by means of an electrical insulating material 43, whereby, a first end thereof are operatively connected with the second end 21 of the layer 18 and their second ends 45 are operatively connected to an electrical conductor 44. The layer 18 and the plurality of conductors 42 are shown to be operatively connected by means of an additional layer of photoconductive material 18a.

The electrical conductors 42, which, because of their electrical resistance characteristics, will be identified as resistors 42, are in series with the respective light radiation controlled areas of the layer 18, extending from the first edge 22 to the second edge 23 thereof. However, since I have shown these resistors 42 as increasing in length from the first edge 22 to the second edge 23, it is intended to indicate that these resistors have an increasing electrical resistance from edge 22 to edge 23.

The conductor 28 and the conductor 44 are shown as being connected in series with a voltage source 30 and a load resistor 31, which circuit is similar to that used and described in conjunction with the previous embodiments of the invention. This embodiment, however, is designed to use a much wider range of resistance values in the form of resistors 42 than it is readily possible, for example, in the case of the embodiment of FIGURE 3. The function of the layer 18 will be that of interconnecting the resistors 42, selectively, in the output circuit of voltage source 30 and load resistor 31, in response to light radiation input command signals.

Each of the embodiments described thus far relates to an improvement in light radiation sensitive variable resistance devices of the type designed to provide a change in resistance, which change in resistance may be used in an output circuit, in response to a change in the relative positions of a light source and the device 10. Although I have shown but one use for the device 10, namely, as an optical line follower in a data conversion system, it will become apparent to those skilled in the arts that the device 10 will lend itself to a wide variety of light controlled potentiometer functions. In view of this, it should also be understood that the straight line array of light conductors, as shown, may be arrayed in the form of circles, or, semicircles, to improve upon their application capabilities.

Referring now to FIGURES 5a, 5b, 5c and 5d, I show another embodiment of my invention which will extend the utility of the basic principles of the invention. FIGURE 5a represents a plan view of the device 10; FIGURE 5b is an end view of 5a; FIGURE 5c is a cross section through A—A of FIGURE 5a; and FIGURE 5d is a cross section through B—B of FIGURE 5a. In this embodiment the assembly 10 utilizes a layer 18 of photoconductive material having first and second ends, 20 and 21, first and second edges, 22 and 23, and a predetermined set of longitudinal dimensions intermediate the first end 20 and the second end 21 extending from the first edge 22 to the second edge 23. There is a plurality of first light conducting fibers 12, each having a predetermined index of refraction, a longitudinal dimension exceeding its cross sectional dimension, and an outer surface generally along its longitudinal dimension being of a smooth surface. There is a second light conducting material 13a having an index of refraction less than the predetermined index of the fibers 12, which is intimately joined with a predetermined portion of the outer surface of each of the fibers 12 forming a smooth interface at and along the juncture. Each of the fibers 12, therefore, is provided with a smooth uncoated portion 16 of its outer surface extending generally along the longitudinal dimension thereof. The layer 18 is disposed upon and intimately joined with a portion of the surface 16 of each of the fibers 12 which acts as a support for the layer 18, and also serves as the means of selectively conducting light radiation to the layer 18.

It will be noted in this embodiment I have chosen to individually jacket each fiber 12 with the lower index light conducting material 13a. In doing so, the jacketed fibers 12 may then be bonded together by means of a resin or plastic material 46, which is not necessarily a conductor of light. Although I have not chosen to show fibers 12 so jacketed with a lower index light conducting material 13 in the previously described embodiments of this invention, it is my intention to utilize either method in each of the embodiments shown.

The device 10 of FIGURE 5a differs, for example, from the device 10 of FIGURE 2a to the extent that the second end 21 of the layer 18 is operatively connected to a plurality of electrical conductors, or electrical contacts 49, which will be engaged by a sliding contacting member 51 as it is moved in the direction of arrow 53. The member 51 also engages an electrical conductor 50 in a sliding contact manner which, in turn, is connected to a voltage source 30. An output circuit load resistor 31 is connected between the source 30 and an electrical conductor 28 which is operatively connected to the first end 20 of the layer 18.

When in operation, the plurality of independently controllable variably dimensioned longitudinal layers of photoconductive material adjoining, respectively, the surfaces 16 of the fibers 12, intermediate the edge 22 and the edge 23 of the layer 18, will respond as light sensitive resistors to electrical currents to light radiation entering the ends 14 of the fibers 12. The variably dimensioned longitudinal layers constitute a plurality of light sensitive resistors of resistance values which vary between the first edge 22 and the second edge 23, for a given intensity of light entering the ends 14 of the fibers 12. Therefore, for a given light intensity voltages appearing intermediate the terminals 32 and 33 will vary as a function of the position of the sliding contacting member 51. For a given output voltage on terminals 32 and 33, an unknown light intensity will be determined by the position of the sliding contact member 51 intermediate the first and second edges, 22 and 23, of the layer 18.

It should, of course, be understood that many of the other embodiments embracing the general principles of the constructions hereinbefore set forth may be utilized and still be within the ambit of the present invention.

The particular embodiments of the invention illustrated and described herein are illustrative only, and the invention includes such other modifications and equivalents as may readily appear to those skilled in the arts, and within the scope of the appended claims.

I claim:
1. A light radiation sensitive variable resistance device comprising:
 (a) a layer of photoconductive material having first and second ends, first and second edges, and a predetermined longitudinal dimension intermediate said first and second ends extending from said first to said second edges;
 (b) a plurality of first light conductor means for supporting said layer and for controlling the conduction of light to said layer, said first light conductor means each having a predetermined index of refraction;
 (c) a second light conductor means adjoining said first light conductor means for controlling, selectively, the reflection of light radiation through said first light conductor means and the reflection of light radiation to said layer, said second light conductor means having an index of refraction less than said first light conductor means;
 (d) a first electrical conductor operatively connected to said first end of said layer; and
 (e) a second electrical conductor operatively connected to said second end of said layer.

2. A light radiation sensitive variable resistance device comprising:
 (a) a plurality of first light conductors, each having a predetermined index of refraction, a longitudinal dimension exceeding its cross sectional dimension, and an outer surface generally along its longitudinal dimension;

(b) a second light conductor having an index of refraction less than said predetermined index, intimately joined with a predetermined portion of the outer surface of each of said first light conductors so as to leave an uncoated portion of the outer surface of each of said first light conductors extending generally along said longitudinal dimension; and (c) a layer of photoconductive material disposed upon and intimately joined with a predetermined portion of the uncoated portion of the outer surface of said first light conductors;

(d) said layer having a predetermined length dimension being adapted to said outer surfaces of said plurality of first light conductors to provide a plurality of predetermined variable length layers of photoconductive material;

(e) said second light conductor being adapted to provide, selectively, the reflection of light radiation through said first light conductors and the reflection of light radiation to said layers of photoconductive material.

3. A light radiation sensitive variable resistance device comprising:

(a) a plurality of first light conductors, each having a predetermined index of refraction, a longitudinal dimension exceeding its cross sectional dimension, and an outer surface generally along its longitudinal dimension;

(b) a second light conductor having an index of refraction less than said predetermined index, intimately joined with a predetermined portion of the outer surface of each of said first light conductors so as to leave an uncoated portion of the outer surface of each of said first light conductors extending generally along said longitudinal dimension;

(c) said second light conductor being adapted to receive light radiation from said first light conductor and thereupon return said light radiation to said first light conductor by reflection therefrom; and (d) a layer of photoconductive material having predetermined length dimensions, being disposed upon and intimately joined with a predetermined portion of the uncoated portion of the outer surface of each of said first light conductors;

(e) said layer being adapted to the outer surface of each of said first light conductors to provide a plurality of predetermined variable length layers of photoconductive material;

(f) said layers of photoconductive material being adapted to receive light radiation being reflected from said second light conductor.

4. A light radiation sensitive variable resistance device comprising:

(a) a plurality of first light conductors, each having a predetermined index of refraction, a longitudinal dimension exceeding its cross sectional dimension, and an outer surface generally along its longitudinal dimension being of a smooth surface;

(b) a second light conductor having an index of refraction less than said predetermined index, intimately joined with a predetermined portion of the outer surface of each of said first light conductors forming a smooth interface at and along the juncture;

(c) each of said first light conductors being provided with an uncoated portion of its outer surface extending generally along said longitudinal dimension;

(d) a layer of photoconductive material having predetermined length dimensions disposed upon and intimately joined with at least a portion of the uncoated portion of the outer surface of each of said plurality of first light conductors;

(e) said layer being adapted to said uncoated portion of the outer surface of each of said plurality of first light conductors whereby the predetermined length dimensions of said layer will provide a plurality of variable length layers of photoconductive material;

(f) said second light conductor being adapted to receive light radiation from said first light conductors, selectively, and redirect said light radiation to said layers of photoconductive material.

5. A light radiation sensitive variable resistance device comprising:

(a) a plurality of first light conductors, each having a predetermined index of refraction, a longitudinal dimension exceeding its cross sectional dimension, and an outer surface generally along its longitudinal dimension being of a smooth surface;

(b) a second light conductor having an index of refraction less than said predetermined index being intimately joined with a predetermined portion of the outer surface of each of said first light conductors forming a smooth interface at and along the juncture;

(c) each of said first light conductors being provided with an uncoated portion of its outer surface extending generally along said longitudinal dimension;

(d) a longitudinally extending layer of photoconductive material disposed upon and intimately joined with at least a portion of the outer surface of each of said first light conductors along said longitudinal dimension;

(e) said longitudinally extending layer having first and second ends and variations in length intermediate said first and second ends thereof, and said layer being adapted to said outer surfaces of said first light conductors whereby said variations in length will provide a plurality of predetermined variable length layers of photoconductive material intermediate said first and second ends;

(f) said second light conductor being adapted to said first light conductor to provide, selectively, the reflection of light radiation through said first light conductor and the reflection of light radiation to said layer intermediate said first and second ends thereof.

6. A light radiation sensitive variable resistance device comprising:

(a) a layer of photoconductive material having first and second ends, first and second edges, and a predetermined set of longitudinal dimensions intermediate said first and second ends extending from said first edge to said second edge;

(b) a plurality of first light conductor means for supporting said layer and for controlling the conduction of light radiation to said layer, each having a predetermined index of refraction and a longitudinal dimension exceeding its cross sectional dimension; and (c) a second light conductor means adjoining said first light conductor means for controlling, selectively, the reflection of light radiation through said first light conductor means and the reflection of light radiation to said layer;

(d) said second light conductor means having an index of refraction less than said first light conductor means;

(e) said layer being adapted to said plurality of first light conductor means whereby said predetermined set of longitudinal dimensions intermediate said first and second ends of said layer will provide a plurality of predetermined variable length layers of photoconductive material extending from said first edge to said second edge of said layer.

7. A light radiation sensitive variable resistance device comprising:

(a) a layer of photoconductive material having first and second ends, first and second edges, and a predetermined longitudinal dimension intermediate said first and second ends extending from said first edge to said second edge;

(b) a plurality of first light conductor means for supporting said layer and for controlling the conduction of light radiation to said layer, each having a predetermined index of refraction and a longitudinal dimension exceeding its cross sectional dimension;

(c) a second light conductor means adjoining said first light conductor means for controlling, selectively, the reflection of light radiation through said first light conductor means and the reflection of light radiation to said layer;

(d) said second light conductor means having an index of refraction less than said first light conductor means;

(e) a first electrical conductor operatively connected to said first end of said layer; and (f) a second electrical conductor operatively connected to said second end of said layer, having first and second ends and a predetermined electrical resistance intermediate the first and second ends thereof.

8. A light radiation sensitive variable resistance device comprising:

(a) a layer of photoconductive material having first and second ends, first and second edges, and a predetermined longitudinal dimension intermediate said first and second ends extending from said first edge to said second edge;

(b) a plurality of first light conductor means for supporting said layer and for controlling the conduction of light radiation to said layer, each having a predetermined index of refraction and a longitudinal dimension exceeding its cross sectional dimension;

(c) a second light conductor means adjoining said first light conductor means for controlling, selectively, the reflection of light radiation through said first light conductor means and the reflection of light radiation to said layer;

(d) said second light conductor means having an index of refraction less than said first light conductor means;

(e) said layer being adapted to said plurality of first light conductor means whereby said predetermined longitudinal dimension intermediate the first and second ends of said layer will provide a plurality of independently controllable longitudinally extended layers of photoconductive material;

(f) a first electrical conductor being operatively connected to said first end of said layer;

(g) a plurality of second electrical conductors, each having first and second ends and a predetermined electrical resistance intermediate the first and second ends thereof;

(h) said first ends of said plurality of second electrical conductors being operatively connected, respectively, to said second ends of said longitudinally extended layers of photoconductive material; and (i) a third electrical conductor being operatively connected to said second ends of said second electrical conductors.

9. A light radiation sensitive variable resistance device comprising:

(a) a plurality of first light conductors, each having a predetermined index of refraction, a longitudinal dimension exceeding its cross sectional dimension and an outer surface generally along its longitudinal dimension;

(b) a second light conductor having an index of refraction less than said predetermined index, intimately joined with a predetermined portion of the outer surface of each of said first light conductors so as to leave an uncoated portion of said outer surface extending generally along said longitudinal dimension;

(c) a layer of photoconductive material disposed upon and intimately joined with a predetermined portion of the uncoated portion of the outer surface of said first light conductors;

(d) said layer having first and second ends, first and second edges, and a predetermined longitudinal dimension intermediate said first and second ends extending from said first edge to said second edge;

(e) a first electrical conductor operatively connected to said first end of said layer;

(f) a second electrical conductor operatively connected to said second end of said layer, having first and second ends and a predetermined electrical resistance intermediate said first and second ends thereof;

(g) said layer being adapted to said plurality of first light conductors whereby said layer will provide a plurality of independently controllable longitudinally extended layers extending from said first electrical conductor to said second electrical conductor;

(h) said second light conductor being adapted to provide, selectively, the reflection of light through said first light conductors and the reflection of light to said layers.

10. A light radiation sensitive variable resistance device comprising:

(a) a layer of photoconductive material having first and second ends, first and second edges, and a predetermined longitudinal dimension intermediate said first and second ends extending from said first edge to said second edge;

(b) a plurality of electrical resistors, each having first and second ends and a predetermined electrical resistance, respectively, intermediate said first and second ends;

(c) said first ends of said resistors being operatively connected, respectively, to said second end of said layer;

(d) a first electrode being operatively connected to said first end of said layer;

(e) a second electrode being connected to the second ends of said plurality of electrical resistors;

(f) a plurality of first light conductor means for supporting said layer and for controlling the conduction of light to said layer, each having a predetermined index of refraction and a longitudinal dimension exceeding its cross sectional dimension;

(g) a second light conductor means adjoining said first light conductor means for controlling, selectively, the reflection of light through said first light conductor means and the reflection of light to said layer, said second light conductor means having an index of refraction less than said first light conductor means;

(h) said layer being adapted to said plurality of first light conductor means to provide a plurality of independently controllable layers of photoconductive material extending from said first electrode to said first ends of said plurality of resistors.

11. A light radiation sensitive variable resistance device comprising:

(a) a layer of photoconductive material having first and second ends, first and second edges, and a predetermined set of longitudinal dimensions intermediate said first and second ends extending from said first edge to said second edge;

(b) a plurality of light conducting optical fibers intimately joined to said layer whereby light escaping from said fibers will illuminate said layer, selectively, intermediate said first and second edges from the first end to the second end of said layer;

(c) a first electrode being operatively connected to said first end of said layer;

(d) a plurality of second electrodes being operatively connected to said second end of said layer intermediate the first and second edges thereof;

(e) said layer being adapted to said plurality of optical fibers to provide a plurality of independently controllable variably dimensioned longitudinal layers of photoconductive material interconnecting, respectively, said plurality of second electrodes with said first electrode;
(f) a third electrode; and
(g) an adjustable contact means for electrically connecting said third electrode to a predetermined one of said second electrodes.

12. A light radiation sensitive variable resistance device comprising:
(a) a first electrical conductor;
(b) a second electrical conductor spaced apart from said first electrical conductor;
(c) a layer of photoconductive material intermediate said first and second electrical conductors and operatively connected thereto;
(d) a plurality of first light conductor means each having a predetermined index of refraction for supporting said first and second electrical conductors and said photoconductive material and conducting light to said photoconductive material; and
(e) a second light conductor means jacketing each of said plurality of first light conductor means and having an index of refraction less than said predetermined index for controlling the reflection of light through said first light conductor means and reflection of light to said photoconductive material.

13. The invention as set forth in claim 12 additionally including:
(f) said second electrical conductor having first and second ends and a predetermined electrical resistance intermediate the first and second ends thereof.

References Cited in the file of this patent
UNITED STATES PATENTS

| | | |
|---|---|---|
| 2,573,373 | Wales | Oct. 30, 1951 |
| 2,967,664 | Ress | Jan. 10, 1961 |
| 2,976,447 | McNaney | Mar. 21, 1961 |
| 3,033,073 | Shuttleworth | May 8, 1962 |
| 3,043,179 | Dunn | July 10, 1962 |